Dec. 31, 1929.  B. C. RINEHART  1,741,792
OIL STORAGE TANK GAUGE
Filed Nov. 21, 1927
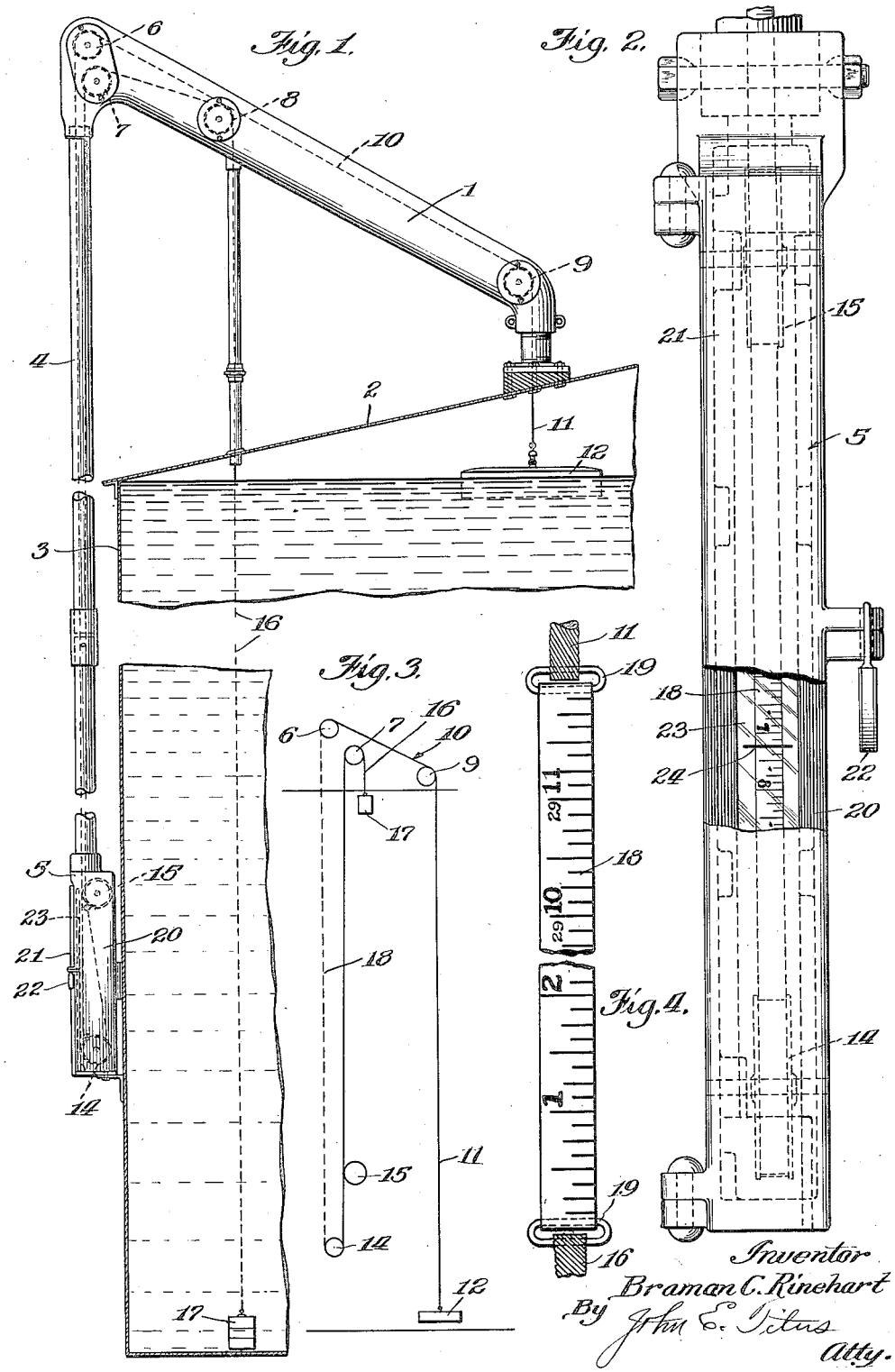
Inventor
Braman C. Rinehart
By John E. Titus
Atty.

Patented Dec. 31, 1929

1,741,792

UNITED STATES PATENT OFFICE

BRAMAN C. RINEHART, OF CHICAGO, ILLINOIS

OIL-STORAGE-TANK GAUGE

Application filed November 21, 1927. Serial No. 234,828.

This invention relates to improvements in gauges for oil storage tanks and the like, wherein a sight gauge is provided for indicating the relative amounts of liquid in the tank.

Heretofore in such devices for indicating the level of the fluid in large tanks, a weight was movably guided in relation with a scale which was fixed at the side of the tank. The weight was suspended by means of a flexible line or cable running over the top of the tank, and connected to a float resting on the surface of the fluid in the tank. Since the oil storage tanks are sometimes as much as thirty feet in height, close, accurate readings could not be obtained by this means because the index mark moved up and down the side of the tank, above and below the eye level. A more modern method consisted of wrapping a flexible cable which was connected to the float in the tank, around a drum to which the dials, indicating feet, inches, and fractions of inches, were geared. Separate dials were of course required for the several denominations named in order to keep the size of the device within practical limits. Obviously readings as close as one-eighth of an inch, which might represent a considerable amount of oil in the tanks which were of large diameter, could not be obtained, since a dial with scale graduated in eighths of an inch over a distance of twenty-five or thirty feet would be an impossibility. Nor could reliable indications be obtained from several dials which are geared progressively one to the other, on account of the backlash and lost motion in the gearing.

In the present invention the scale consists of a linear flexible member such as a steel tape or the like. The tape is doubled back upon itself so that a full sized scale may be used in a small space. The scale is wound around a fixed pulley at the side of the tank, and the scale is connected to the float in the tank and to suitable means for keeping the tape under a running tension. The main objects of this invention are to provide a simple form of gauge more especially for large size oil storage tanks which can be installed on any kind of tank at a relatively low cost; to provide a gauge which is accurate and reliable under all conditions, and in which close readings may be obtained; and to provide a gauge which can be easily and quickly adjusted.

To describe this invention more fully, reference is made to the accompanying drawings, in which:

Fig. 1 is a fragmental view of one side of an oil storage tank, with a gauge embodying my invention shown in position thereon.

Fig. 2 is a front elevation of the gauge box shown in Fig. 1.

Fig. 3 is a diagram of the gauge.

Fig. 4 is a detailed view of the scale.

A housing 1 is mounted on the roof 2 of the tank 3, with the outer end of the housing overhanging the edge of the tank roof, and connected by the length of pipe 4 to the upper end of the gauge box 5, which is mounted on the side of the tank. In the housing 1 are mounted the pulleys 6 and 7, one above the other near the outer end of the housing, the pulley 8 in the intermediate portion of the housing, and the pulley 9 at the inner end of the housing.

The flexible line 10 is connected at one end 11 to the float 12, and passed up over the pulley 9, over the pulley 6, down through the piping 4 into the gauge box 5, around the pulley 14, which is mounted in the lower end of the box back up over the guide pulley 15, back through the pipe 4, around the pulley 7, and over the pulley 8, to the downfall portion 16, which connects at its lower end to the counterweight 17.

The end portions 11 and 16 of the line consist preferably of stranded steel sash cord and the steel tape 18 as represented by broken lines in Fig. 3, is connected in the intermediate portion of the line. This consists of a full size flexible steel measuring tape with the feet, inches, and eighths of inches marked thereon as shown in detail in Fig. 4. The tape is connected at its ends to the cable sections by means of the wire loops 19.

Describing the gauge box in detail, the box consists of a hollow rectangular sectioned housing 20 provided with a hinged cover 21 along the front side. To prevent unauthorized persons from reading the gauge, the door may be secured in closed position by means of a suitable padlock 22. The front of the housing is covered with a glass plate 23 directly underneath the door, and the index mark 24 is placed on the rear surface of the glass. The tape is guided in close relation with the glass so that sufficiently accurate readings may be obtained. In operation, when the float 12 is at the bottom of the tank the length of the line is adjusted so that the zero mark on the tape is in registration with the index mark 24. The tape will then occupy the portion of the line extending from the pulley 14 to the pulley 6, with the graduations reading upwardly; and the tape is held under sufficient tension, usually twelve or fifteen pounds, to keep it stretched taut over the pulleys. When the float 12 rises, the tape 18 of course moves downwardly a corresponding amount, and the counterweight 17 is lowered into the tank. Thus the tape is maintained in position at all times to indicate the height of the float, and consequently the depth of the fluid in the tank.

Obviously the construction is very simple and reliable. The apparatus can be easily installed on any type of tank, and quickly adjusted to give the proper readings. A small float can be used since the only work required of the float is to move the small weight of the line over the pulleys, which of course may be provided with frictionless bearings.

Having thus described my invention my claims are:

1. In a gauge for oil storage tanks, a housing mounted on the roof of the tank and in closed communication with the interior of the tank, a box mounted on the outer side of the tank, a pipe connecting the box to the housing, a pulley rotatably mounted in the box, a flexible line running over the pulley and guided through the pipe and the housing with both ends of the line suspended in the tank, a weight attached to one end and a float attached to the other end of the line in the tank for holding the line under tension and positioning the line according to the level of the liquid in the tank, the box having a window with an index marked thereon, and the portion of the line running through the box having graduations marked thereon.

2. In an oil storage tank gauge, a housing mounted on the roof of the tank and having a portion extending downwardly on the outside of the tank, a pulley mounted in the lower end of said portion, a flexible graduated line looped over the pulley and runningly guided in the housing so that both ends hang in the tank, a float attached to one of said ends, a weight attached to the other end so that the weight is disposed within the tank, and a window for the lower end of said housing portion so that readings may be conveniently taken from the ground level.

In testimony whereof I affix my signature.

BRAMAN C. RINEHART.